United States Patent
Gohel et al.

(10) Patent No.: US 10,404,364 B2
(45) Date of Patent: Sep. 3, 2019

(54) SWITCH MATRIX SYSTEM

(71) Applicant: Teradyne, Inc., North Reading, MA (US)

(72) Inventors: Tushar K. Gohel, Winchester, MA (US); David Kaushansky, Winchester, MA (US); Pavel Gilenberg, Needham, MA (US); Pedro M. Teixeira, Waltham, MA (US); Casey A. Hersey, Chelmsford, MA (US); Frank L. Booth, Jr., Chelmsford, MA (US)

(73) Assignee: Teradyne, Inc., North Reading, MA (US)

( * ) Notice: Subject to any disclaimer, the term of this patent is extended or adjusted under 35 U.S.C. 154(b) by 122 days.

(21) Appl. No.: 15/583,630

(22) Filed: May 1, 2017

(65) Prior Publication Data

US 2018/0316421 A1 Nov. 1, 2018

(51) Int. Cl.
*H04B 10/077* (2013.01)
*H04Q 11/00* (2006.01)
*H04B 10/073* (2013.01)

(52) U.S. Cl.
CPC ..... *H04B 10/0775* (2013.01); *H04B 10/0731* (2013.01); *H04Q 11/0005* (2013.01); *H04Q 2011/0058* (2013.01); *H04Q 2011/0083* (2013.01)

(58) Field of Classification Search
None
See application file for complete search history.

(56) References Cited

U.S. PATENT DOCUMENTS

| | | | |
|---|---|---|---|
| 6,563,352 B1 | 5/2003 | Gohel et al. | |
| 6,665,085 B1 * | 12/2003 | Edmunds | G06F 11/2294 358/1.15 |
| 6,894,505 B2 | 5/2005 | Gohel | |
| 7,317,801 B1 | 1/2008 | Amir | |
| 7,395,479 B2 | 7/2008 | Gohel et al. | |
| 7,420,375 B2 | 9/2008 | Gohel | |
| 8,086,100 B2 | 12/2011 | Aronson et al. | |
| 8,310,270 B2 | 11/2012 | Gohel et al. | |
| 8,988,081 B2 | 3/2015 | Gohel et al. | |
| 9,240,774 B2 | 1/2016 | Gohel | |
| 9,298,866 B1 | 3/2016 | Elmufdi et al. | |

(Continued)

OTHER PUBLICATIONS

File History of U.S. Appl. No. 15/583,686, 77 pages (Retrieved Aug. 24, 2017).

(Continued)

*Primary Examiner* — Kenneth N Vanderpuye
*Assistant Examiner* — David W Lambert
(74) *Attorney, Agent, or Firm* — Choate, Hall & Stewart LLP

(57) ABSTRACT

An example system includes circuitry to receive an input signal, to provide a related signal based on informational content of the input signal, and to obtain parametric data associated with the input signal. The parametric data represents one or more signal characteristics other than the informational content. The example system also includes a first switch that is configurable to provide first data based on the related signal to one or more first channels of the system; and a second switch that is configurable to provide second data based on the parametric data to one or more second channels of the system.

26 Claims, 4 Drawing Sheets

(56) References Cited

U.S. PATENT DOCUMENTS

| | | | |
|---|---|---|---|
| 2003/0099139 A1 | 5/2003 | Abrosimov et al. | |
| 2003/0206127 A1 | 11/2003 | Roberts et al. | |
| 2004/0056666 A1 | 3/2004 | Gohel | |
| 2004/0236253 A1* | 11/2004 | Vortman | A61N 7/02 601/2 |
| 2005/0073268 A1 | 4/2005 | Schrodinger et al. | |
| 2005/0146320 A1 | 7/2005 | Gohel | |
| 2005/0193275 A1 | 9/2005 | Gohel | |
| 2006/0161827 A1 | 7/2006 | Gohel et al. | |
| 2007/0273439 A1 | 11/2007 | Lin et al. | |
| 2008/0109504 A1 | 5/2008 | McDonald | |
| 2008/0158026 A1 | 7/2008 | O'Brien | |
| 2009/0091347 A1 | 4/2009 | Gohel et al. | |
| 2009/0232191 A1* | 9/2009 | Gupta | H04L 27/2096 375/216 |
| 2011/0096821 A1 | 4/2011 | Olgaard et al. | |
| 2011/0116558 A1* | 5/2011 | Otaka | H03F 1/34 375/259 |
| 2011/0199096 A1 | 8/2011 | Kidambi | |
| 2012/0106351 A1 | 5/2012 | Gohel et al. | |
| 2013/0106399 A1 | 5/2013 | Gohel et al. | |
| 2013/0124134 A1 | 5/2013 | Gohel | |
| 2014/0131811 A1* | 5/2014 | Saitoh | H01L 21/845 257/392 |
| 2015/0149839 A1 | 5/2015 | Olgaard | |
| 2016/0094187 A1 | 3/2016 | Staudinger et al. | |
| 2018/0316420 A1 | 11/2018 | Gohel et al. | |
| 2018/0316423 A1 | 11/2018 | Gohel et al. | |
| 2018/0316424 A1 | 11/2018 | Gohel et al. | |
| 2018/0316990 A1 | 11/2018 | Gohel et al. | |
| 2019/0033372 A1 | 1/2019 | Gohel et al. | |

OTHER PUBLICATIONS

File History of U.S. Appl. No. 15/583,664, 84 pages (Retrieved Aug. 24, 2017).

File History of U.S. Appl. No. 15/583,608, 73 pages (Retrieved Aug. 24, 2017).

File History of U.S. Appl. No. 15/583,554, 69 pages (Retrieved Aug. 24, 2017).

International Search Report for PCT/US2018/025632, 5 pages (dated Jul. 17, 2018).

Written Opinion for PCT/US2018/025632, 10 pages (dated Jul. 17, 2018).

Astronics, Test instrumentation from COTS to custom, including VXI, PXI and LXI-based platforms, 3 pages (2018). URL: https://www.astronics.com/product?productgroup=Test%20%26%20Measurement&subproduct=test%20instruments [Retrieved Apr. 1, 2019].

Keysight Technologies, Synthetic Instruments, 3 pages (2000-2019). URL: https://www.keysight.com/en/pc-1000003152%3Aepsg%3Apgr/synthetic-instruments?nid=-33804.0.00&cc=US&lc=eng&cmpid=20039 [Retrieved Apr. 2, 2019].

Maliniak, D., The Basics of Creating a Modular Test Strategy, ElectronicDesign, 20 pages (May 23, 2012).

National Instruments, Understanding a Modular Instrumentation System for Automated Test, 9 pages (Mar. 19, 2019). URL: http://www.ni.com/en-us/innovations/white-papers/12/understanding-a-modular-instrumentation-system-for-automated-tes.html [Retrieved Apr. 1, 2019].

Overton Instruments—The Source for Embedded Test Solutions, 4 pages (2017-2018). URL: http://overtoninstruments.com/ [Retrieved Apr. 1, 2019].

* cited by examiner

SWITCH MATRIX SYSTEM

TECHNICAL FIELD

This specification relates generally to a switch matrix system for distributing informational content data and parametric data among transmission channels.

BACKGROUND

A signal includes informational content and characteristics other than informational content. For example, an optical signal may have an optical power level, which is a measure of the energy delivered by the optical signal per unit of time. In another example, an electrical signal may have a signal-to-noise ratio, which reflects the relative amounts of signal and noise in a transmission. These signal characteristics that do not represent the informational content of the signal are referred to as parametric information, and may be represented by data, called parametric data.

SUMMARY

An example system includes circuitry to receive an input signal, to provide a related signal based on informational content of the input signal, and to obtain parametric data associated with the input signal. The parametric data represents one or more signal characteristics other than the informational content. The example system also includes a first switch that is configurable to provide first data based on the related signal to one or more first channels of the system; and a second switch that is configurable to provide second data based on the parametric data to one or more second channels of the system. The example system may include one or more of the following features, either alone or in combination.

The one or more first channels and the one or more second channels may be, or include, the same channels. The one or more first channels and the one or more second channels may be, or include, different channels. The one or more first channels and the one or more second channels may have one or more constituent channels in common. The one or more first channels may be a first number of channels, the one or more second channels may be a second number of channels, and the first number and the second number may be different numbers. The input signal may be optical and the related signal may be electrical.

The parametric data may be first parametric data. The second switch may be configured to receive second parametric data from the one or more second channels, and to provide the second parametric data to one or more third channels of the system.

The example system may include instrument modules, each of which may include, or define, a channel. Each instrument module may be for performing one or more testing operations on one or more units under test (UUTs). The instrument modules may include a first instrument module that includes the circuitry. The example system may also include a backplane to interconnect the instrument modules. The backplane may include the first switch and the second switch to enable transmission of the first data and the second data among the instrument modules.

At least one instrument module may be for performing one or more operations, which may include testing first data from one or more channels of the system that passes through the first switch. At least one instrument module may be for performing one or more operations, which may include testing parametric data from one or more channels of the system that passes through the second switch. At least one instrument module may be for performing one or more operations, which may include receiving the first data from the first switch, processing the first data to produce processed first data, and sending the processed first data to the first switch. At least one instrument module may be for performing one or more operations, which may include receiving the parametric data from the second switch, processing the parametric data to produce processed parametric data, and sending the processed parametric data to the second switch. At least one instrument module may be for performing one or more operations, which may include generating at least one of informational content data representing informational content to send to the first switch or parametric data to send to the second switch. An instrument module may perform all or some of the above operations.

The first switch may be, or include, a cross-point switch matrix, and the second switch may be, or include, a field programmable gate array (FPGA). The circuitry may include an interface circuit to receive the input signal, to convert the input signal to the related signal, and to obtain the parametric data based on the input signal.

The instrument modules may include a second instrument module comprising output circuitry. The system may include a control system to receive instructions, and to control the output circuitry based on the instructions, the first data, and the second data. The output circuitry may be controlled to produce an output signal that is based on the first data, the second data, and the instructions. The output signal may represent the input signal based on the first data, and may have parametric characteristics that are based on the second data, the instructions, or both.

The parametric data may represent information about the input signal comprising one or more of the following: optical power level, signal-to-noise ratio, modulation amplitude, extinction ratio, wavelength, rise time, fall time, slew rate, or any other characteristic relating to a wave or the wave's shape. The input signal may be an optical signal, and the related signal may be a digital signal.

An example method includes receiving an input signal (e.g., an optical signal, an analog related signal, or a digital related signal); obtaining a related signal based on informational content of the input signal; obtaining parametric data associated with the input signal, with the parametric data representing one or more signal characteristics other than the informational content; providing first data based on the related signal to one or more first channels of a system; and providing second data based on the parametric data to one or more second channels of the system. The example method may include one or more of the features set forth above for the example system either alone or in combination.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Figure 1:
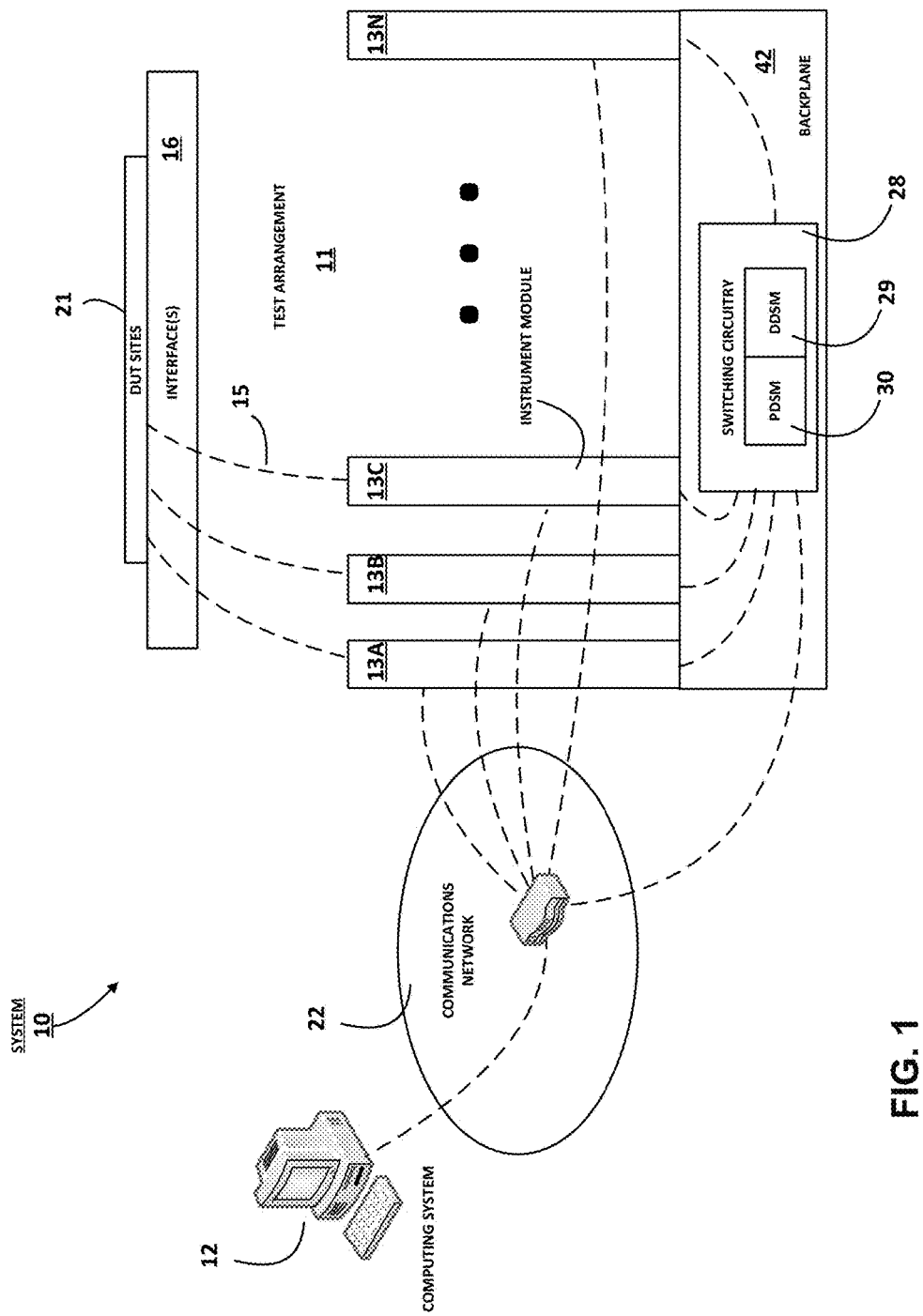
FIG. 1 is a block diagram of components of an example system that incorporates an implementation of the switch matrix system described herein.

Described herein are example systems that include multiple instrument modules. Each of the instrument modules is configured to communicate with one or more devices being tested by the system, and also to communicate with other instrument modules that are part of the system. A device being tested is referred to herein as a device under test (DUT) or a unit under test (UUT). Each instrument module is part of a communication (e.g., test) channel (or simply, "channel"), over which communications occur. The instrument modules communicate with each other over one or more transmission media on a backplane or other appropriate structure to which the instrument modules interface. For example, the instrument modules may communicate via one or more serial buses on the backplane or via an Ethernet-based network.

Switching circuitry, which may reside on the backplane or at another appropriate location in the system, directs communication data to and from different instrument modules/communication channels. The switching circuitry enables, among other things, any appropriate communication data to be transmitted from one channel to multiple channels (via their respective instrument modules), from multiple channels to one channel, or from one channel to another, different channel. The communication process may include replicating all or part of the communication data as closely as possible on one or more other channel(s), or processing the communication data and transmitting the resulting processed communication data, as appropriate. The communication process may also include substituting user-provided, or other, communication data for existing communication data, where appropriate.

The communication data may include data that represents both informational content and data that represents one or more signal characteristics other than informational content. Informational content includes the information being transmitted in a signal optically or electrically (e.g., a bit stream). Data that represents the informational content is referred to herein as informational content data. Data that represents one or more signal characteristics other than informational content is referred to herein as parametric data. For example, in some implementations, an instrument module may receive an input signal. The input signal may be optical or electrical; however, for illustration, an optical signal is received in this example.

The optical signal may represent, for example, test data from a UUT or commands from a host computing system to control testing. The optical signal may be received over one or more optical fibers interfaced to, or otherwise in communication with, the system. The optical signal represents information, as indicated, but also has other characteristics. For example, the optical signal may have an optical power level, a signal-to-noise ratio, modulation amplitude, extinction ratio, wavelength, rise time, fall time, slew rate, or any other characteristic relating to a wave or the wave's shape. The instrument module receives the optical signal and converts the optical signal into an electrical (e.g., digital) signal comprising informational content data representing the informational content of the optical signal (e.g., the test data, commands, etc.). The instrument module also captures the other characteristics—the parametric information—associated with the optical signal, and generates parametric data representing this parametric information. Both the informational content data and the parametric data may constitute the communication data referred to above, and may be transmitted among the instrument modules and associated communication channels.

As indicated above, the input signal may also be an electrical signal. The electrical signal may be a digital signal or an analog signal, for example. Electrical signals also have associated parametric information, such as signal-to-noise ratio, amplitude values, and so forth. Thus, an instrument module may receive an electrical signal—which may be analog or digital—generate informational content data representing the received electrical signal, and generate parametric data representing the parametric information associated with the electrical signal. The processing described herein for the resulting informational content data and parametric data is substantially the same regardless of whether the original input signal is optical or electrical. For this reason, the following addresses receipt of an optical signal only, with the understanding that the processing described herein applies equally in cases where the original input signal is electrical. Also, individual channels may contain more than one informational stream and, although the processing described herein relates to individual streams per channel, the processing described herein likewise applies to multiple informational streams per channel.

In some implementations, the switching circuitry comprises a first switching circuit and a second switching circuit. The first switching circuit is referred to as the signal switching circuit or the digital data switch matrix (DDSM), since this switching circuit provides, or distributes, to various instrument modules/communication channels, informational content data that represents the informational content of the original signal. In some implementations, the DDSM is a single part that is a full cross-point switch and that is configured to operate on high-speed digital data. In an example, high-speed data may include data that is transmitted on the order of gigabits-per-second (Gb/s); however, the DDSM is not limited to use with such data transmission speeds. The DDSM may be configured to receive data on one channel's input and to reproduce that data on any number of desired outputs. In some implementations, the DDSM does not capture any data in memory; it simply makes a copy of the data on each desired output. In some implementations, the DDSM may store data in on-board memory. In some implementations, the DDSM has input buffers and re-drivers.

The second switching circuit is referred to as the parametric switching circuit or the parametric data switch matrix (PDSM), since this switching circuit provides, or distributes, to various instrument modules/communication channels, parametric data representing one or more signal characteristics other than informational content. In some implementations, the PDSM is a virtual switch matrix that enables high-speed serial communication of individual channels' parametric data transmitted among instrument modules in real-time. The system architecture supports parametric data of all appropriate types including, but not limited to, optical power levels, signal-to-noise ratio, modulation amplitude, extinction ratio, wavelength, rise time, fall time, slew rate, or any other characteristic relating to a wave or the wave's shape. In some implementations, the use of the PDSM is optional. In such implementations, a host computing system can simply select a desired output parameter (e.g., power level) for each channel and ignore the measured parameter at the input. The selected data can be transmitted to multiple channels simultaneously. In some implementations, the PDSM is configured to obtain parametric data from one or more instrument modules and is configured to transmit any module's port and channel parametric data to any other module's port and channel. This operation may be done on a continual basis as the data in question is changing. The PDSM may obtain parametric data from both input and output ports. In some implementations, either the PDSM or the DDSM is not used, e.g., it is not present or not used for a particular data transfer.

Some implementations may employ a different switch matrix configuration than that described here. For example, in some implementations, a single switch matrix may handle both the informational content data and the parametric data. For example, a single hardware switch may include both PDSM and DDSM functionality.

The DDSM and the PDSM may be configured, or controlled, to operate in parallel. For example, the DDSM may be configured to transmit informational content data at the same time as the PDSM transmits parametric data, and the PDSM may be configured to transmit parametric data at the same time as the DDSM transmits informational content data. In some implementations, the DDSM and the PDSM may be configured, or controlled, to operate independently or in concert to distribute their respective data to appropriate communication channels of the instrument module.

In an example operation, an example instrument module #1 may receive an input optical signal, convert that optical signal into informational content data (e.g., a digital signal) representing the informational content of the optical signal, and, during the conversion process, obtain parametric data representing the optical power of the optical signal (a non-informational characteristic of the optical signal). The informational content data and the parametric data may be sent over appropriate transmission media from the instrument module to the switching circuitry (e.g., the informational content data to the DDSM and the parametric data to the PDSM). The switching circuitry, in this example, may be configured, e.g., by a host computing system, to provide the informational content data to example instrument modules #2, #3, and #4, and to provide the parametric data to example instrument modules #4, #5, and #6. Instrument module #4 may use both the informational content data and the parametric data to replicate, on its output communication channel, the optical signal originally received by instrument module #1. That is, the optical signal output by instrument module #4 may be generated using the informational content data and the parametric data to have the same informational content and non-informational characteristics (e.g., optical power—also referred to as optical signal power) as the optical signal received by instrument module #1. Instrument modules #2 and #3 may output an optical signal representing the informational content data and having any appropriate parametrics, the data for which may be stored in the respective instrument modules or received from elsewhere. Instrument modules #5 and #6 may use the received parametric data to generate optical signals having the same optical power as the optical signal received by instrument module #1. The informational content data used to generate the informational content of the optical signals output by instrument modules #5 and #6 may be obtained from any appropriate source. Other examples of functionalities available through the instrument modules are provided below.

In some implementations, all or part of the switching circuitry does not process its data, but rather is only configurable to transmit data from one location to another location. In some implementations, all or part of the switching circuitry may include on-board intelligence that enables processing of the data prior to output from the switching circuitry. In any case, processing device(s) either on, or off, the backplane, may process the informational content data and/or the parametric data prior to distribution by the switching circuitry or following distribution by the switching circuitry. Processing may include, but is not limited to, changing the content of the data, changing a timing of the data, changing packet headers for the data, and so forth. Therefore, rather than providing the informational content data and the parametric data received, the switching may provide modified versions of that data to the various instrument modules/transmission channels. In some implementations, the switching circuitry may substitute designated informational content data and/or parametric data for different data, where the different data may be specified by a control system, such as the host computing system, based on programmatic input. In some implementations, circuitry other than the switching circuitry (e.g., output circuitry) may substitute the designated informational content data and/or parametric data for different data.

In some implementations, the communication channels may include an input channel and an output channel, although the communication channels between which parametric and/or informational content data are passed may be two input channels or two output channels. In some implementations, the input channel includes circuitry configured to receive an optical (or electrical) signal from one or more transmission media external to the system, to convert the optical signal to an electrical (e.g., a digital) signal comprising informational content data, to obtain parametric information about the optical signal before, during, or after the conversion process, and to obtain parametric data based on the information (e.g., to generate digital data representing the parametric information). In an example, the parametric information may be measured by an interface circuit and converted to digital data by the interface circuit or other appropriate logic. In some implementations the output channel includes circuitry configured to receive an electrical (e.g., a digital) signal comprising informational content data from internal to the system (e.g., from the switching circuitry), to convert the electrical signal to an optical (or electrical) signal, to obtain parametric information about the optical signal before, during, or after the conversion process, and to obtain parametric data based on the information (e.g., to generate digital data representing the parametric information). In an example, the parametric information may be measured by an interface circuit and converted to digital data by the interface circuit or other appropriate logic. The parametric data from the output channel may be sent back to the switching circuitry, e.g., via another channel. The parametric data of the input channel or the output channel may be used in any appropriate manner described herein.

FIG. 1 shows components of example system 10 that incorporates an example switch matrix system. Notably, however, the switching matrix system described herein is not limited to use in the context of testing or to use with the example systems described herein, but rather may be used in any appropriate technical context, including outside of a testing environment. In FIG. 1, the dashed lines represent, conceptually, potential signal paths between components of the system. In this regard, in some implementations, the host computing system does not communicate directly with the instrument modules. Rather, there is a local bus controlled by an FPGA on the backplane that handles communication between the instrument modules and the host computing system. In some implementations, the FPGA that handles the communications is the same FPGA that implements the PDSM.

System 10 includes a test arrangement 11 and a host computing system 12. Test arrangement 11 may include interface(s) to one or more UUTs (not shown) on which tests are performed. Host computing system 12 communicates with components of the testing arrangement to control testing. For example, host computing system 12 may download test program sets (TPS) to instrument modules on the test arrangement, which then run the test program sets to test UUTs in communication with the test arrangement. Host computing system 12 may also send, to instrument modules in the test arrangement, instructions, test data, and/or other information that is usable by the corresponding instrument module to perform appropriate tests on a UUT interfaced to the test arrangement. In some implementations, this information may be sent via a computer network. Host computing system 12 or a system controller may configure the DDSM and the PDSM based on user-provided, or other, programmatic inputs. The programming may specify switch configurations within the DDSM and the PDSM, or other appropriate operations or configurations. The DDSM and PDSM may be programmed and reprogrammed in real-time, as appropriate. In some implementations, the foregoing information may be sent via an optical network comprised of fiber optic lines that transmit optical signals between the instrument modules and the computer. Conversions between optical and electrical signals may be performed by the host computing system and by the respective instrument modules, as described herein. In some implementations, the foregoing information may be sent via a computer network, such as a local area network (LAN) or a wide area network (WAN).

In the example of FIG. 1, system 10 includes multiple instrument modules 13A to 13N, each of which may be configured, as appropriate, to perform one or more of the functions described herein. Although only four instrument modules are depicted, the system may include any appropriate number of instrument modules, including those residing outside of test arrangement 11. In some implementations, each instrument module may be configured to output test signals to test a UUT based, e.g., on data provided by the host computing system, and to receive signals from the UUT. Different instrument modules may be configured to perform different tests and/or configured to test different UUTs. The signals received may include response signals that are based on the test signals and/or signals that originate from the UUT that are not prompted by (e.g., are not in response to) test signals. In some implementations, there may be electrical connections between the UUT and the instrument modules, in which case the test data and response signals may be sent electrically. In some implementations, there may be optical connections between the UUT and the instrument modules, in which case the test data and response signals may be sent optically. In some implementations, there may be direct fiber optic lines/links between the UUTs and the instrument modules, over which optical signals are transmissible. In some implementations, there may be an optical network between the UUTs and the instrument modules, over which optical signals are transmissible. In some implementations, there may be a combination of optical and electrical transmission media between the instrument modules and the UUTs. In some instances the UUT may only interface with instrument modules through the DDSM or PDSM.

Each instrument module may include input circuitry (e.g., an interface card) for receiving signals from one or more UUTs or other appropriate signal source(s). Each instrument module may include output circuitry for outputting signals to a communication channel defined by the instrument module. In some implementations that employ optical communications, each instance of the input circuitry includes an interface circuit configured to receive an optical signal, configured to convert the optical signal to an electrical (e.g., a digital) signal, configured to obtain parametric information about the optical signal before, during, or after the conversion process, and configured to obtain parametric data based on the information (e.g., to generate digital data representing the parametric information). In an example, the parametric information may be measured by the interface circuit and converted to digital data by the interface circuit or other appropriate logic. In some implementations, the interface circuit may be implemented using a device, such as a field-programmable gate array (FPGA), an application-specific integrated circuit (ASIC), or other appropriate hardware.

In some implementations, one or more instrument modules include one or more optical interfaces that are designed to support 850 nanometers (nm) multi-mode optical communication from 1 Gb/s to 12 Gb/s or higher. In some implementations, other types of optical interfaces may be used, or no optical interfaces may be used.

Figure 2:
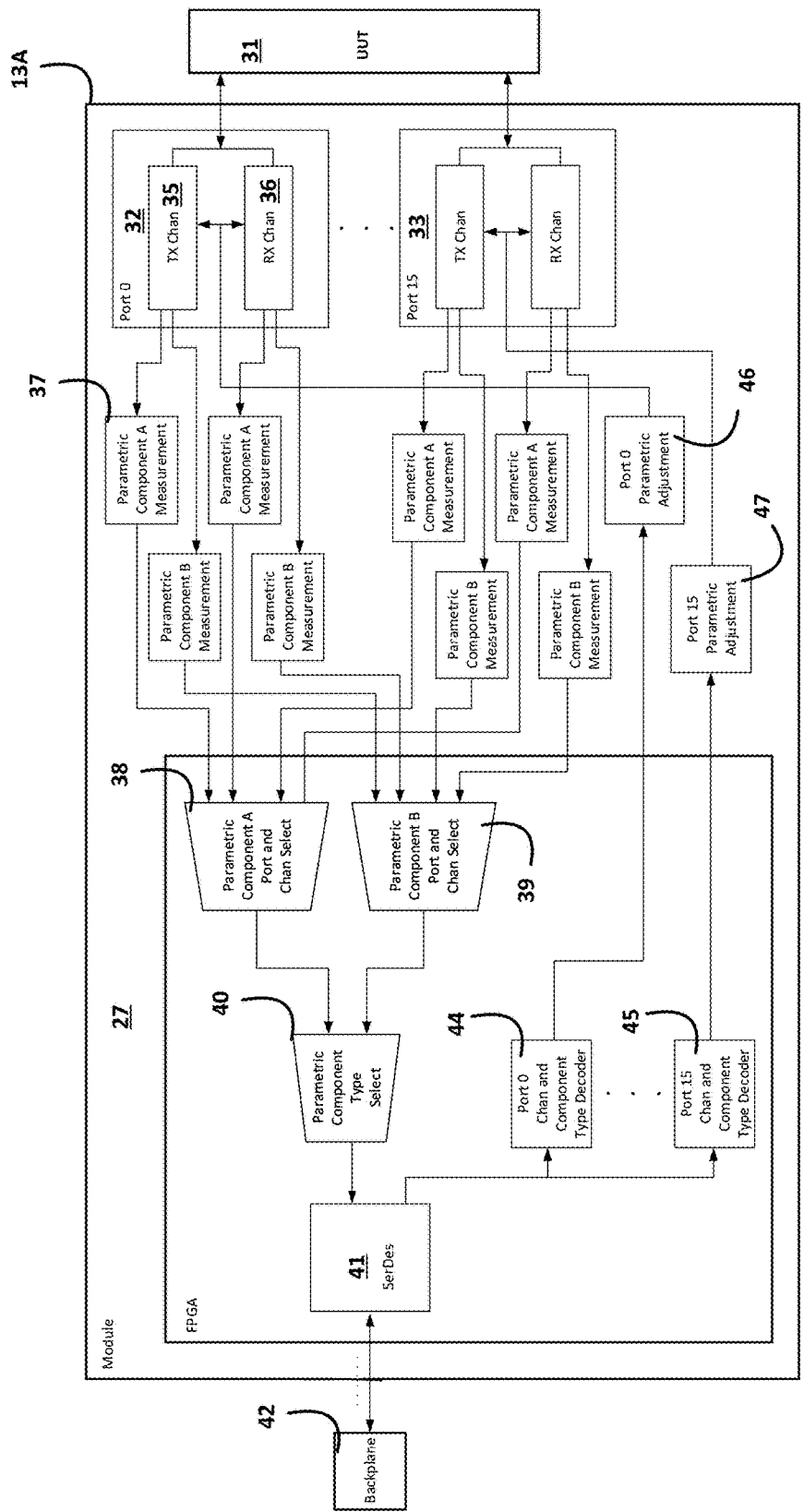
FIG. 2 is a block diagram of components of an example instrument module for transmitting parametric data from an instrument module to a backplane.

FIG. 2 shows an example implementation of circuitry 27 that may be included in an instrument module, such as 13A. In this example, instrument module 13A interfaces to a UUT 31 and exchanges test and response signals with that UUT. In this example, instrument module 13A includes sixteen ports, of which two, 32 and 33, are shown. Each port includes a transmit channel ("TX Chan") 35 and a receive channel ("RX Chan") 36. The receive channel is part of the input circuitry, and is configured to receive signals from the UUT or elsewhere. The transmit channel is part of the instrument module's output circuitry, and is configured to output signals to the UUT or elsewhere. Circuitry 27 includes parametric measurement circuits, an example of which is 37. In this example, two parametric components, A and B (e.g., optical power and wavelength, respectively), are measured. Therefore, there is one corresponding parametric measurement circuit for each transmit and receive channel. That is, one parametric measurement circuit for a channel measures component A and one parametric measurement circuit for that channel measures component B. Parametric data representing those parametric components is sent from each channel to multiplexers 38 and 39—one for each parametric component, A and B. Multiplexers 38 and 39 each select data from channels designated, e.g., by the host computing system. Multiplexer 40 selects whether to provide parametric data for component A or for component B to the serial bus transmission circuit 41, which passes that data to backplane 42. Circuitry 27 also includes decoders—one for each channel, of which two, 44 and 45, are shown. These decoders transmit, to the input circuitry, information that is usable to adjust parametric data (via circuits 46 and 47) at the various ports.

Referring also to FIG. 1, the instrument modules may be interconnected through backplane 42 or any other appropriate electrical or mechanical mechanism. For example, instrument modules 13A to 13N may mechanically interface, e.g., plug into, backplane 42 of FIG. 1. Backplane 42 may include one or more transmission media over which communications pass among the various instrument modules. For example, the transmission media may be, or include, one or more serial buses such as a peripheral component interconnect express (PCIe) bus, Ethernet cable, or other appropriate media. In the case of a PCIe bus, the parametric data may be encapsulated in PCIe bus packet format and transmitted from instrument module logic (e.g., an FPGA) to the PDSM. In some implementations, different parametric data types may be stored in different packets. In some implementations, the PDSM decodes incoming PCIe bus packets and stores the decoded parametric data in data-type-specific random access memory (RAM), which may also reside on the backplane and which may be accessed by the instrument modules and the host computing system. Bus protocols other than PCIe and other types of encapsulation may be used.

Communications among the instrument modules pass through switching circuitry 28 which, as described herein, includes one or more programmable switching matrices in some implementations. Switching circuitry 28 is configurable to receive informational content data and parametric data, and to distribute the informational content data and parametric data among the instrument modules. As explained, informational content data received from an instrument module may be provided to one or more of the same communication channels, or to one or more different communication channels. Parametric data received from an instrument module may be provided to one or more of the same communication channels, or to one or more different communication channels. In some implementations, some of the informational content data may be sent to one set of channels, and some of the parametric data may be sent to another set of channels, with at least part of the first and second sets overlapping, at least in part. In some implementations, the informational content data and the parametric data may be sent to different numbers of channels or to the same number of channels. Basically, any routing that is appropriate may be implemented. In some implementations, instrument modules may receive data from the switching circuitry, manipulate that data, and send the data back to the switching circuitry through another channel. For example, an instrument module may include output circuitry to receive informational content data and parametric data, and to manipulate the informational content data and/or the parametric data, and send signals representing that information back to the switching circuitry (e.g., to the PDSM and/or DDSM, as appropriate) for further routing. Example instrument module functionalities are described below.

In this regard, in some implementations, instrument modules in the system may vary in capabilities. In an example, an instrument module, such as instrument module 13A of FIG. 1, receives an input signal—which may be an optical signal or an electrical (digital or analog) signal—and separates the input signal's informational component (bit stream) from the input signal's parametric component. The system processes each component separately. The system also supports the testing of each signal's informational and parametric components, as well as the retransmission of these components, e.g., to another instrument module through an appropriate switch. In some implementations, the system is configured so that, through appropriate programming, the bit stream (the informational component) on a channel may be reproduced on any other channel output, and that bit stream may have output parameters that can be specified programmatically in absolute terms or relative to one or more references, such as the parameters of another channel.

As explained, on some implementations, switching circuitry 28 may include a first switch (the DDSM 29) to handle distribution of the informational content data, and a second switch (the PDSM 30) to handle distribution of the parametric data. Each switch 29 and 30 may be programmable and/or under control of host computing system 12 in the manner described herein. In some implementations, as noted, each switch 29 and 30 may, or may not, have on-board intelligence that enables processing its respective data prior to output to the instrument modules/communication channels. In some implementations, the DDSM is implemented using a cross-point switch matrix; and, in some implementations, the PDSM is implemented using an FPGA. In some implementations, the DDSM is implemented using a cross-point switch matrix that receives and forwards data without performing any processing on the data; and, in some implementations, the PDSM is implemented using an FPGA that receives and forwards data and that is also capable of performing processing on the data. However, hardware other than that described herein may be used to implement the DDSM and the PDSM. Thus, the DDSM and/or the PDSM may be capable of processing data.

Figure 3:
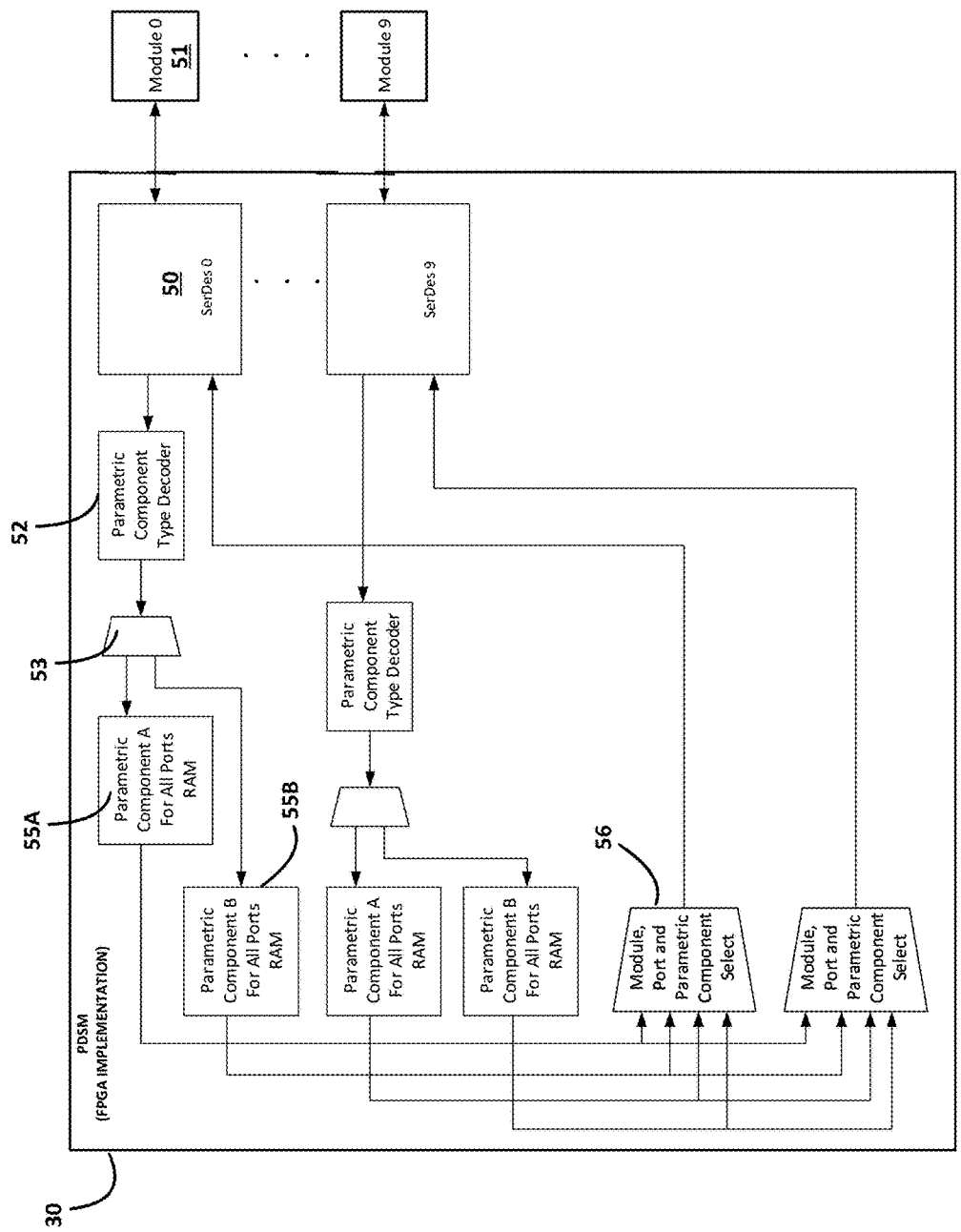
FIG. 3 is a block diagram of components of an example parametric data switch matrix that may be included in the example system.

An example implementation of PDSM 30 is shown in FIG. 3. PDSM 30 includes an input interface 50 for passing data received (RX) from an instrument module ("0") 51, and for passing data to be transmitted (TX) data to the instrument module. A decoder 52 (one for each receive channel in the example of FIG. 3) decodes parametric data passed as PCIe packets to the PDSM, and outputs parametric data to a input demultiplexer, an example of which is 53. Each input demultiplexer 53 receives all parametric data components for the same input or output interface from all ports of the instrument module and outputs those parametric data components to parametric data random access memories (RAMs) 55A and 55B. At an appropriate time, the parametric data components are output to one or more multiplexers, an example of which is 56. Control over output may be implemented by a host computing system or a hardware controller to switch parametric data as desired. The output multiplexer sends the parametric data, as appropriate, to a TX output for transmission to an instrument module or retransmission back to the switch through another, different instrument module. As shown, the PDSM is implemented using an FPGA in this example.

Referring back to FIG. 1, a separate processing device, which may or may not reside on the backplane, may perform processing before, during, or after distribution implemented by the switches. In some implementations, processing may be directed by, or under control of, host computing system 12, which is described below. In some implementations, the processing may be performed in the instrument modules. In some implementations, network 22 communicates through transmission media and logic on the backplane 42 with instrument the modules.

In some implementations, host computing system 12 communicates with the instrument modules over a network 22, which may be an appropriate Ethernet-based communication network, an appropriate optical network, a wireless network, or some combination thereof. Thus, in some implementations, network 22 may be, or include one or more optical networks, including fiber optic links between the host computing system and the instrument modules In some implementations, network 22 may be, or include, a LAN, wide area network (WAN), or a combination thereof. In some implementations, network 22 may be, or include, a combined optical and electrical network between the host computing system and instrument modules.

In the example of FIG. 1, system 10 also includes one or more interfaces 16 that connects, optically, electrically and/or mechanically, to components of test arrangement 11, such as the instrument modules. The interface(s) each define one or more sites 21, which may include pins, traces, or other points of electrical, optical, and/or mechanical connection to which one or more UUTs may connect—e.g., one UUT per site. Test signals, response signals, and other information pass over the sites between the UUT and instrument modules 13A to 13N. Connections between the instrument modules and the UUTs may be optical, electrical, or a combination thereof. In some implementations, each instrument module may include a separate interface, e.g., an optical interface, that connects, through optical transmission media, directly to a UUT.

In an example implementation, the system supports up to ten modules—each having sixteen channel inputs and sixteen channel outputs—that plug into a backplane, such as backplane 42. Other implementations, however, may have different numbers of modules, channels, ports, and the like. The backplane includes hardware to implement the switch matrix functionality described herein (e.g., the switching performed by the DDSM and the PDSM). As described, the example system may be configured to capture all information about a signal at an input and to reproduce that same signal at the output. This includes the informational content component as well as parametric components, such as the power levels, waveform, and the like.

In an example, the switching circuitry may be configured to connect a signal from one channel to another channel, and to preserve the power level of the signal on that other channel. In an example operation, the DDSM passes data for that signal to the other channel/instrument module without performing any processing on the data for that signal. The PDSM provides the instrument module that controls the output signal with the measured power levels (parametric data) of the input channel. The instrument module then produces a signal having the informational content of the signal data and having the power level represented by the parametric data. The same concepts can be used for margin testing. For example, a user may want to emulate an optical fiber having a 2 decibel (dB) loss. The user can program the output of an instrument module to always produce a signal having an output power level that is 2 dB less than a power level measured at its input. The system also supports adding gain, e.g., programing the output of an instrument module to always produce a signal having an output power level that is 2 dB greater than the power level measured at an input.

In some implementations, the host computing system can configure the PDSM so that parametric data from any appropriate port and channel can be sent to any other appropriate port and channel. The host computing system can also program the system so that parametric data is not sent to any given port or channel on a per channel basis. After a configuration is defined, the PDSM may send parametric data encapsulated in PCIe (or other) packet format to all designated instrument modules, ports, and channels. In some implementations, the configuration can be modified in real-time.

In some implementations, each instrument module may be configured to implement functions to support the PDSM. A first example function includes continually measuring the parametric data of ports and channels of the instrument module. A second example function includes obtaining the parametric data measurements for input signal(s) and sorting those parametric data measurements into types—e.g., into parametric components A and B of FIG. 2. After sorting, the parametric data measurements are encapsulated in PCIe formatted packets and sent to the backplane over an appropriate serial bus. A third example function includes receiving, per port and per channel, parametric data from the backplane and applying the individualized parametric data to the corresponding port and channel within the instrument module.

In some implementations, the PDSM on the backplane, on an ongoing basis, receives and decodes high-speed serial parametric data from each of the instrument modules connected to the backplane, or a subset thereof. The PDSM multiplexes the received parametric data serially back to the appropriate module(s). In an example system, pin electronics in instrument modules support parametric testing of transmitted and received optical signals. Dedicated instrument modules may be configured to perform testing or other functions as set forth with respect to FIG. 4.

Figure 4:
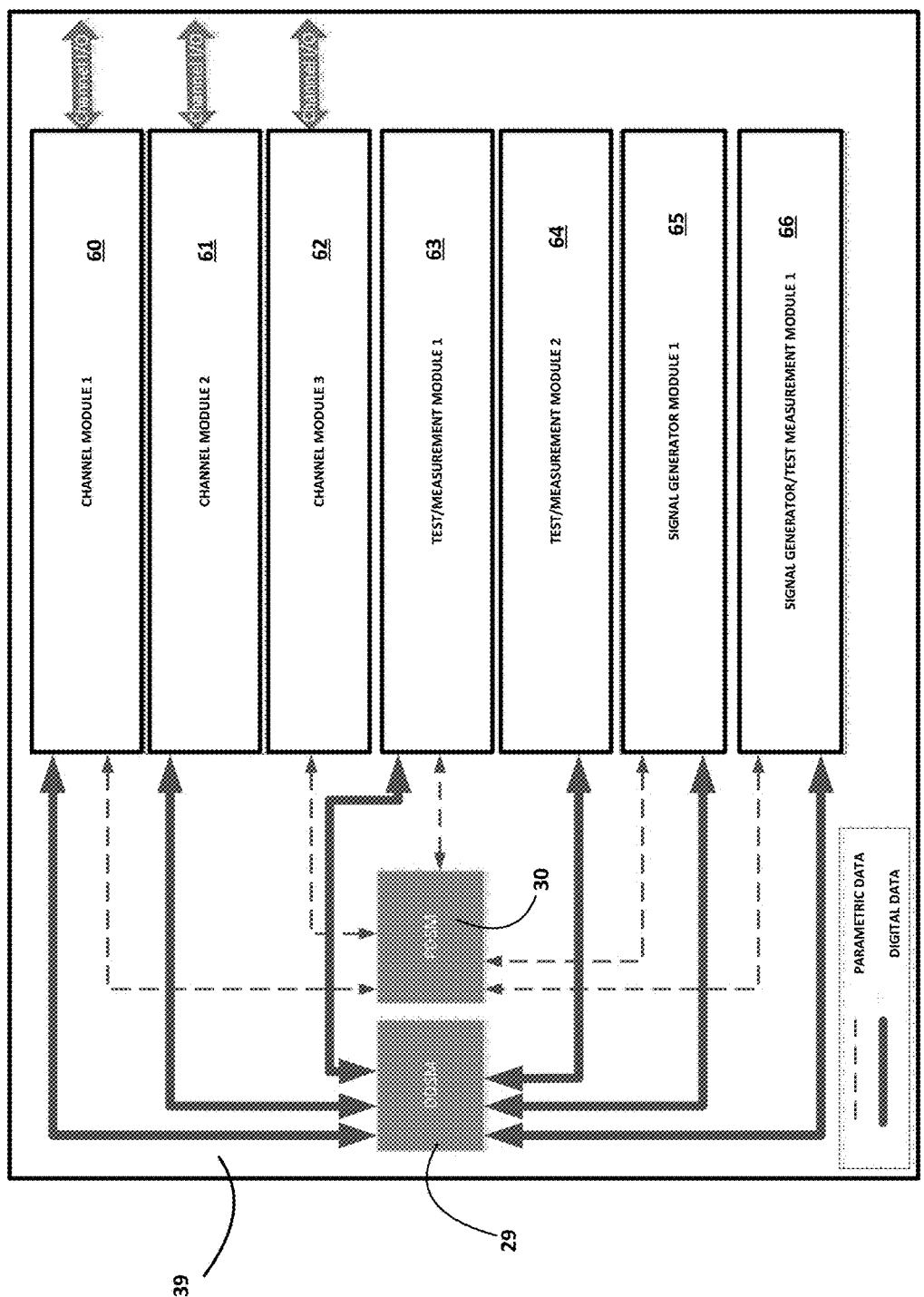
FIG. 4 is a block diagram showing examples of instrument modules having different functionalities that may be included in the example system.

In this regard, FIG. 4 shows examples of instrument modules having dedicated functionalities. The configuration of the overall system is versatile and there are no restrictions or limitations on instrument module configurations or functions.

Channel Module 1 60: This instrument module interfaces with a UUT. In an example operation, each example channel input separates informational content data from parametric data and transmits the informational content data to the DDSM and the parametric data to the PDSM. Each channel output obtains its informational content data from the DDSM and its parametric data from the user or from the PDSM based on user-provided programmatic inputs. A user may program test conditions on the parametric data for each channel in the module.

Channel Module 2 61: This instrument module interfaces with a UUT. In an example operation, each channel input transmits informational content data to the DDSM and no parametric data is captured. The instrument module obtains its informational content data from the DDSM. Parametric data for generating an output signal based on the informational content data is determined by appropriate hardware on the instrument module.

Channel Module 3 63: This instrument module interfaces with a UUT. In this example, no informational content data is transferred to, or from, the DDSM. So, in this example, the instrument module simply loops-back data coming in from another channel on the same instrument module. Input parametric data is sent to the PDSM and can be used as a source of parametric data for another channel. In some implementations, the parametric data for a signal output may be programmed to be based on another channel connected to the PDSM, as described herein.

Test/Measurement Module 1 63: This module connects to both the DDSM and the PDSM, enabling programmatic test of informational content data and of parametric data of any other channel connected to the DDSM and the PDSM.

Test/Measurement Module 2 64: This module connects only to the DDSM, enabling programmatic testing of informational content data from the DDSM.

Signal Generator Module 1 65: This module connects to the DDSM and the PDSM, enabling the system to programmatically generate informational content data having desired output parameters on any channel connected to both the PDSM and DDSM. If a module is not connected to the PDSM, informational content data through the DDSM can be transmitted.

Signal Generator/Test Measurement Module 1 66: This module connects to the DDSM and PDSM and includes functionality that is a combination of the Signal Generator Module 1 65 and Test/Measurement Module 1 63 described above.

In some implementations of the circuitry described herein, multiple optical transmission media (e.g., multiple optical fibers) may be used to provide at least informational content to a single electrical transmission medium (e.g., a wire). In some implementations of the circuitry described herein, multiple optical transmission media may be used to receive at least informational content from a single electrical transmission medium. In some implementations of the circuitry described herein, multiple electrical transmission media (e.g., multiple wires) may be used provide at least informational content to a single optical transmission medium (e.g., an optical fiber). In some implementations of the circuitry described herein, multiple electrical transmission media may be used to receive at least informational content from a single optical transmission medium. In some implementations of the circuitry described herein, the same circuitry may include one or more optical transmission media and one or more electrical transmission media to provide at least informational content to a single electrical transmission medium. In some implementations of the circuitry described herein, the same circuitry may include one or more optical transmission media and one or more electrical transmission media to receive at least informational content from a single electrical transmission medium. In some implementations of the circuitry described herein, the same circuitry may include one or more optical transmission media and one or more electrical transmission media to provide at least informational content to a single optical transmission medium. In some implementations of the circuitry described herein, the same circuitry may include one or more optical transmission media and one or more electrical transmission media to receive at least informational content from a single optical transmission medium.

In some implementations, the circuitry described herein may be used to control the parametric characteristics of one channel (e.g., an output channel) based on the parametric characteristics of any one other channel (input or output channel). In some implementations, the circuitry may be used to control the parametric characteristics of multiple channels (input or output channel) based on the parametric characteristics of any one other channel (input or output channel). In some implementations, the circuitry may be used to control the parametric characteristics of one channel (e.g., an output channel) based on the parametric characteristics of multiple other channels (input or output channel). For example, a single channel may produce a signal having the optical power of one channel and the wavelength of another, different channel using circuitry encompassing the single channel and the two other channels.

In the examples described herein, processing of data is performed in the electrical domain. However, in some implementations, all or part of the processing maybe be performed in the optical domain using appropriate optical circuitry.

The system and features described herein may be implemented as, or be part of, automatic test equipment (ATE). ATE refers to an automated, usually computer-driven, system for testing devices. ATE typically includes a computer system, such as that shown in FIG. 1, and one or more instrument modules (e.g., as shown in FIG. 1) or a single device having corresponding functionality. In an example operation, in response to instructions in a test program set (TPS), some ATE automatically generates input signals to be applied to a UUT, and monitors output signals from the UUT. In some implementations, pin electronics in the ATE compares the received output signals with expected responses (e.g., thresholds) to determine whether the UUT is defective or has passed a test. In an example, an instrument module outputs voltage and/or current to the UUT, and receives voltage and/or current from the UUT. For example, in some implementations, ATE may be capable of forcing voltage to a UUT and sourcing current to the UUT. In some implementations, the ATE is capable of providing test signals to a UUT, receiving response signals from the UUT, and forwarding those response signals for processing to determine whether the UUT meets testing qualifications. Signals are transmitted between the ATE and the UUT over the communication channels described herein. The test and response signals may be processed as described herein, e.g., to identify their informational and parametric content, to distribute data representing the informational and parametric content, and so forth.

Taking the case of optical power as an example, optical pin electronics in a channel may provide sourcing and measuring capabilities on each channel to control optical power level. In some implementations, the average optical output power is regulated to a desired static or dynamic level. A static level includes a value specified by a user. A dynamic level includes a power level that is related to a measured power level of an external or internal reference. For example, the optical power on one channel may be controlled based on parametric data representing the optical power on another channel. For example, any appropriate parameter on one channel may be controlled based on parametric data for another channel. In general, since the measured parameters on one channel can be used to produce a signal on another channel, the system described herein can be used simulate signal attenuation and/or signal amplification in some implementations. Optical pin electronics in each channel also supports programmatic control of the modulation amplitude of the optical output.

In some implementations, test signals may be sent over multiple channels and test results may be based on response signals received from multiple channels. In some implementations, test signals may be sent over a single channel and test results may be based on response signals received from a single channel. In some implementations, test signals may be sent over a multiple channels and test results may be based on response signals received from a single channel. In some implementations, test signals may be sent over a single channel and test results may be based on response signals received from multiple channels. The circuitry described herein may be programmed, e.g., by a user at a host computing system or a test program set to send test signals over, and receive response signals from, a single channel or multiple channels as desired.

In general, the circuitry described herein for generating optical signals for output may include any appropriate device, such as one or more lasers or light-emitting diode(s) (LEDs) or a vertical-cavity surface-emitting laser (VCSEL).

Testing performed using the example systems described herein may be implemented using hardware or a combination of hardware and software. For example, a system like the ones described herein may include various controllers and/or processing devices located at various points in the system to control operation of the automated elements. A central computer may coordinate operation among the various controllers or processing devices. The central computer, controllers, and processing devices may execute various software routines to effect control and coordination of the various automated elements.

The techniques described herein may be performed by systems or any other appropriate computing device. The techniques can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" or "optical connection" as used herein may imply a direct physical connection or a wired or wireless connection that includes or does not include intervening components but that nevertheless allows signals to flow between connected components. Any "connection" involving electrical circuitry or optical components mentioned herein that allows signals to flow between two points, unless stated otherwise, is not necessarily a direct physical connection regardless of whether the word "electrical" or "optical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
    a first instrument module for testing a first unit under test (UUT), the first instrument module comprising circuitry to receive an input signal from the UUT, to provide a related signal based on informational content of the input signal, and to obtain parametric data associated with the input signal, the parametric data representing one or more signal characteristics other than the informational content;
    a second instrument module for testing a second UUT;
    a first switch that is configurable to provide first data based on the related signal to the second UUT via one or more first channels of the system; and
    a second switch that is configurable to provide second data based on the parametric data to the second UUT via one or more second channels of the system.

2. The system of claim 1, wherein the one or more first channels and the one or more second channels are the same channels.

3. The system of claim 1, wherein the one or more first channels and the one or more second channels are different channels.

4. The system of claim 1, wherein the one or more first channels and the one or more second channels have one or more constituent channels in common.

5. The system of claim 1, wherein the one or more first channels is a first number of channels, the one or more second channels is a second number of channels, and the first number and the second number are different numbers.

6. The system of claim 1, wherein the parametric data is first parametric data; and
    wherein the second switch is configured to receive second parametric data from the one or more second channels, and to provide the second parametric data to one or more third channels of the system.

7. The system of claim 1, wherein each instrument module is for performing one or more testing operations on one or more UUTs; and
    wherein the system comprises a backplane to interconnect the first instrument module and the second instrument module, the backplane comprising the first switch and the second switch to enable transmission of the first data and the second data between the first instrument module and the second instrument module.

8. The system of claim 1, wherein the second instrument module is configured to perform testing using the first data.

9. The system of claim 1, wherein the second instrument module is configured to perform testing using the parametric data.

10. The system of claim 1, wherein the second instrument module is configured to perform operations comprising receiving the first data from the first switch, processing the first data to produce processed first data, and sending the processed first data to the first switch.

11. The system of claim 1, wherein the second instrument module is configured to perform operations comprising receiving the parametric data from the second switch, processing the parametric data to produce processed parametric data, and sending the processed parametric data to the second switch.

12. The system of claim 1, wherein the second instrument module is configured to perform operations comprising generating at least one of informational content data representing informational content to send to the first switch or parametric data to send to the second switch.

13. The system of claim 1, wherein the first switch comprises a cross-point switch matrix, and the second switch comprises a field programmable gate array (FPGA).

14. The system of claim 1, wherein the circuitry comprises:
an interface circuit to receive the input signal, to convert the input signal to the related signal, and to obtain the parametric data based on the input signal.

15. The system of claim 1, wherein the second instrument module comprises output circuitry; and
wherein the system comprises a control system to receive instructions, and to control the output circuitry based on the instructions, the first data, and the second data.

16. The system of claim 15, wherein the output circuitry is controlled to produce an output signal that is based on first data, the second data, and the instructions.

17. The system of claim 16, wherein the output signal represents the input signal based on the first data, and has parametric characteristics that are based on the second data and the instructions.

18. The system of claim 1, wherein the parametric data represents information about the input signal comprising one or more of the following: power level, signal-to-noise ratio, modulation amplitude, extinction ratio, wavelength, rise time, fall time, or slew rate.

19. The system of claim 1, wherein the input signal is an optical signal, and the related signal is a digital signal.

20. A method comprising:
receiving an input signal at a first instrument module for testing a first unit under test (UUT);
obtaining a related signal based on informational content of the input signal at the first instrument module;
obtaining parametric data associated with the input signal at the first instrument module, the parametric data representing one or more signal characteristics other than the informational content;
providing first data based on the related signal to a second instrument module via one or more first channels of a system, the second instrument module for testing a second UUT; and
providing second data based on the parametric data to the second instrument module via one or more second channels of the system.

21. The method of claim 20, wherein the one or more first channels and the one or more second channels are different channels.

22. The method of claim 20, wherein at least some of the one or more first channels and at least some of the one or more second channels are the same channels.

23. The system of claim 1, wherein the input signal is optical and the related signal is electrical.

24. The method of claim 20, wherein the input signal is optical and the related signal is electrical.

25. The system of claim 1, wherein the circuitry comprises input circuitry to receive the input signal from the first UUT, and to provide the related signal to a transmission line internal to the system.

26. The system of claim 1, wherein the circuitry comprises output circuitry to provide the related signal to a transmission line external to the system.

* * * * *